United States Patent
Eddy, Jr.

[11] Patent Number: 5,148,894
[45] Date of Patent: Sep. 22, 1992

[54] DISK BRAKE/PARKING BRAKE WITH THREADED PISTON ROD AND MOTOR

[75] Inventor: William C. Eddy, Jr., West Bloomfield, Mich.

[73] Assignee: Allied-Signal Inc., Morris Township, Morris County, N.J.

[21] Appl. No.: 598,464

[22] Filed: Oct. 11, 1990

[51] Int. Cl.$^5$ .............................................. F16D 55/26
[52] U.S. Cl. .............................. 188/72.6; 188/106 F; 188/265
[58] Field of Search .............................. 188/72.6–72.8, 188/72.3, 106 F, 106 P, 265, 72.1, 162, 157, 31

[56] References Cited

U.S. PATENT DOCUMENTS

| | | | |
|---|---|---|---|
| 3,814,484 | 6/1974 | Matthews et al. | 303/20 |
| 4,175,646 | 11/1979 | Eikelberger | 188/156 |
| 4,215,767 | 8/1980 | Shirey | 188/265 |
| 4,487,295 | 11/1984 | Mitchell | 188/72.6 |
| 4,565,265 | 1/1986 | Woolley | 188/72.6 |
| 4,637,664 | 1/1987 | Arikawa | 303/111 |
| 4,674,804 | 6/1987 | Burgdorf et al. | 303/6 R |
| 4,795,219 | 1/1989 | Brearley et al. | 303/9.69 |
| 4,804,073 | 2/1989 | Taig et al. | 188/72.8 X |
| 4,805,105 | 2/1989 | Weiss et al. | 303/DIG. 3 X |
| 4,809,824 | 3/1989 | Fargier et al. | 188/72.1 X |
| 4,852,008 | 7/1989 | Sager | 303/105 X |
| 4,895,227 | 1/1990 | Grenier et al. | 188/106 F X |

Primary Examiner—Robert J. Oberleitner
Assistant Examiner—Josie A. Ballato

[57] ABSTRACT

A brake (10) capable of functioning as a disk brake and parking brake having engaged and disengaged modes of operation comprising: a piston rod (30) movable with the disk brake piston (14) having a threaded portion (40), a nut (60) rotatably movable on the threaded portion (40) relative to a first stop (52); a pressurizing device (80, 82, 84; 92) for pressurizing the fluid chamber (20) to move the piston (14) and piston rod (30) to respective engaged positions, and a motor (66, 68) for rotating the nut (60) in one of a) synchronism with pressurizing the fluid chamber and b) subsequent thereto so that the nut moves along the threaded portion (40) into a contracting position with the first stop (52) for preventing the piston rod (30) from moving from its engaged position to achieve the parking brake function.

9 Claims, 1 Drawing Sheet

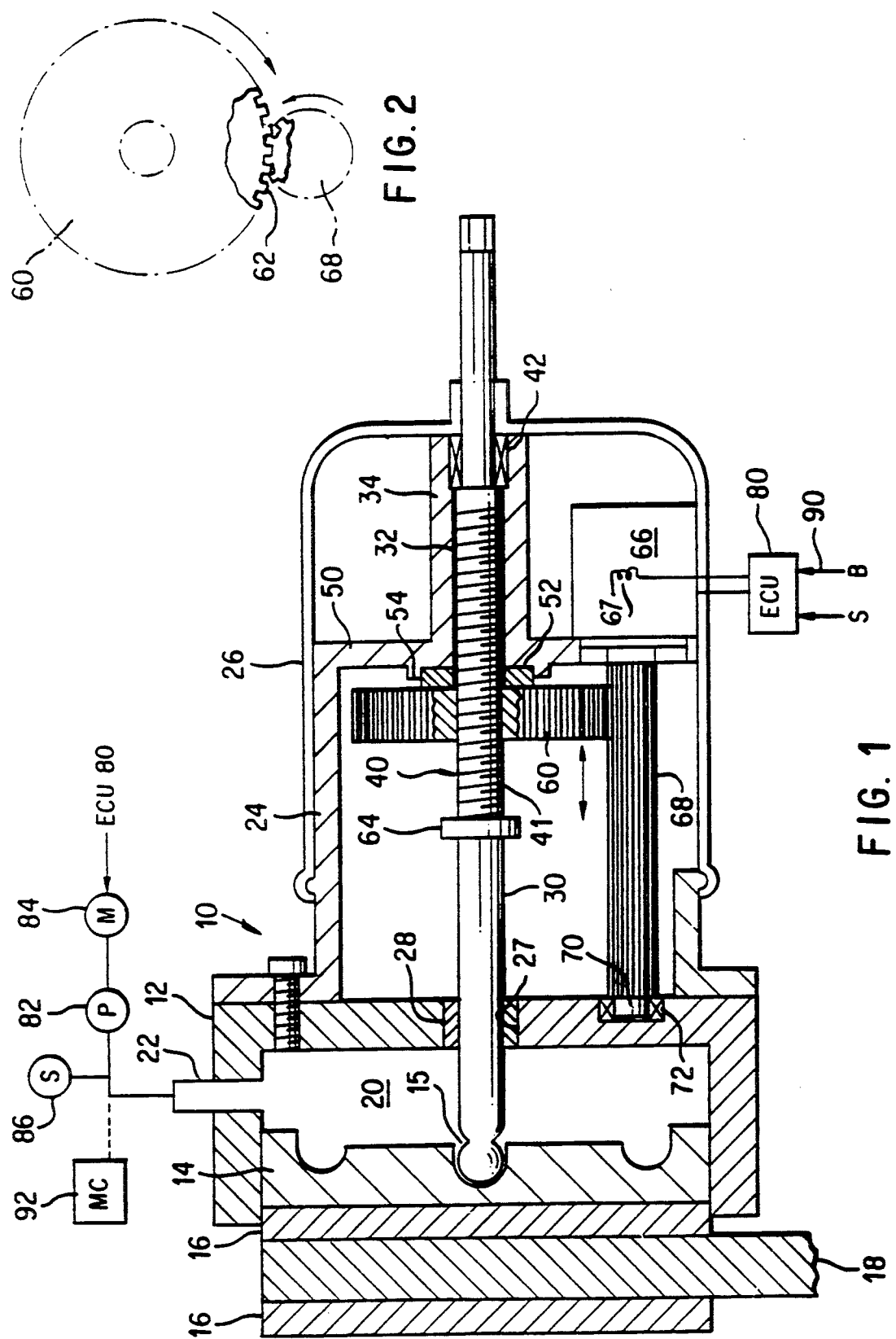

DISK BRAKE/PARKING BRAKE WITH THREADED PISTON ROD AND MOTOR

BACKGROUND AND SUMMARY OF THE INVENTION

The present invention relates generally to disk brakes and more particularly to a disk brake which can also function as a parking brake.

Disk brakes primarily comprise a rotor and a caliper. The caliper houses a piston moved by fluid (hydraulic) pressure to cause engagement of brake pads with the rotor. To achieve a parking brake function in vehicles having disk brakes, a separate brake has been required in the prior art. The only use of this separate brake is to achieve the parking brake function.

It is an object of the present invention to provide a disk brake mechanism and more particularly an improved caliper which can function as a foundation brake as well as a parking brake.

Many other objects and purposes of the invention will be clear from the following detailed description of the drawings.

BRIEF DESCRIPTION OF THE DRAWINGS

In the drawings:
FIG. 1 illustrates a cross-sectional view of the present invention.
FIG. 2 illustrates another view of the present invention.

DETAILED DESCRIPTION OF THE DRAWINGS

With reference to FIGS. 1 and 2 there is shown a disk brake/parking brake generally shown as 10. The brake 10 comprises a caliper 12 The caliper supports a movable piston 14 which causes one or both brake pads 16 to move into friction engagement with a rotor 18. The caliper 12 and piston 14 cooperate, as is known in the art, to form a fluid chamber 20 for receipt of the fluid (typically hydraulic) through a passage 22. Extending from the caliper is a housing 24. A cover 26 is secured to the housing 24 in a known manner by bolts, welds, etc. The caliper 12 includes an opening 27 about which is positioned a fluid seal 28. A piston rod 30 extends through the seal 28 and is connected to and movable with the piston 14. The piston 14 and rod 30 may be rotatably mounted at 15 to allow for relative movement therebetween. A middle portion 40 of the piston rod 30 is helically threaded at 41. The piston rod 30 also extends through a bore 32 formed in a cylindrical portion 34 of the housing 24. A bushing 42 is provided at an end of the cylindrical portion 34 to support the piston rod 30. An end 44 of the piston rod 30 extends through the cover 26. The end 44 is hexagonally or otherwise shaped to receive a tool such as a wrench or screwdriver, the purpose of which will be clear from the description below. A radially extending portion 50 of the housing 24 supports a backing plate 52 typically fabricated of ferrous material, which extends slightly beyond a face 54 of the housing portion 50.

A nut 60 is rotatably received about the threaded portion 41 of the piston rod 30. The periphery of the nut 60 is toothed to form a spur gear 62 which is shown more clearly in FIG. 2. A mechanical stop 64 may also be provided about the piston rod 30 at the left hand end of the threads 41.

Located in the housing 24 is a relatively low torque capacity electric motor generally shown as 66. The motor shaft (not shown) is coupled to a cylindrical elongated spur gear 68 supported at its remote end 70 by another bushing or bearing 72. The spur gear 68 drivingly engages the spur gear 62 of the nut 60. The individual teeth of the spur gear 68 extend axially along this gear 68 from the motor to the bearing 72 which enables the nut 60 may slide thereupon. FIG. 2 also shows a cross-sectional view illustrating the interaction between the spur gears 62 and 68.

During normal brake operation hydraulic fluid is received through passage 22 to fill chamber 20, whereupon the piston 14 is moved outwardly under the pressure of the fluid causing the brake pads to move into contact with the rotor 18. During normal brake operation, the piston rod 30, nut 60, motor 66, etc. are not operative. As the piston 14 moves to the right or to the left, as shown in FIG. 1, in response to fluid pressure spring bias (not shown) the piston rod 30 is carried with it and slides within the seal 28 and bearing 42. The nut 60 also moves with the piston rod 30 as the teeth or spur gear 62 of the nut 60 slide along the axially extending teeth of the spur gear 68.

When it is desired to use the brake 10 as a parking brake, pressurized hydraulic fluid is supplied to the chamber 20 causing the brake pads 16 to engage the rotor sufficiently to prevent rotation of same. A fluid pressure of 1,000-1,500 psi should be sufficient. Subsequently, the motor 66 is energized by a control unit generally shown as 80 whereupon the cylindrical spur gear 68 rotates. In response to this motion, the nut 60 moves along the threads 41 into contact with the backing plate 52. The significance of this motion is as follows: with the brake pads 16 in contact with the rotor 18 the nut is moved into engagement with the housing or backing plate 52 thereby locking the piston rod 30 is a position wherein the brake pads remain in locking contact with the rotor 18 even when the fluid pressure in chamber 20 is subsequently reduced.

With reference to FIG. 1 there is shown a pump 82 powered by another electric motor 84. The fluid chamber or brake lines, as the case may be, may be sensed by a pressure sensor generally shown as 86. The above-referenced combination of motor and pump and ECU has been disclosed in my commonly assigned, pending U.S. Pat. application Ser. No. 07/589,739entitled "Parking Brake and Method Therefor" which is incorporated herein by reference. In response to an operator initiated signal such as by depressing a switch B (or 90) the motor is activated thereby pressurizing the fluid chamber 20 to a level of approximately 1,000-1,500 psi, which is sensed by the sensor 86 in cooperation with the ECU 80. Upon reaching this activation pressure, the brake pads 16 are moved into contacting engagement with the rotor 18. Either simultaneously or subsequent to the initiation of motor 84 operation, the ECU commands the motor 66 to rotate as described above, causing the nut 60 to move into engagement with the backing plate or stop 52 effectively locking the piston rod 30 in an engaged position. The operation of the motor 66 is terminated after the nut 60 has engaged the backing plate or stop 52 Stopping the motor 84 is accomplished by monitoring the current level in motor 66 in a known manner. It is known that the current of such a motor i.e., motor coil 67 will increase as its load increases. Such increased load is achieved upon the engagement of the nut 60 to the backing plate 62 and its reaction force which is transferred back to the spur gear 68 and hence to the motor 66. As can be seen from the above the monitoring of the motor current level is directly indicative of the fact that the nut is in engagement with the backing plate or stop 52. As also described above when the nut is moved into engagement with the backing plate the piston rod is locked, that is, in an engaged position with the brake pads in locking contact with the rotor 18. The motor 67 in combination with a current monitoring circuit (such as one in the ECU) provides a means for sensing that the piston rod is in such as engaged position.

FIG. 1 also shows a master cylinder 92 in fluid communication with the fluid chamber 20. The pressurization of the fluid chamber can be done manually thereby eliminating the need for the pump and motor combination In this mode of operation, the operator would pressurize the fluid chamber by stepping upon the brake pedal. When the master cylinder has been pressurized to the necessary pressure as sensed by the sensor 86, the ECU may thereafter illuminate a light or other indicator thereby requesting that the operator engage a button such as B (or 90) thereby activating motor 66 which moves the nut 60 into engagement with the backing plate 52.

To release the above-described brake 10 from its parking brake function additionally requires the pressurization of the fluid chamber 20. This subsequent pressurization can be done automatically upon depressing the button B (or 90) causing the motor and pump to once again pressurize the chamber 20, or alternatively, manually in a manner as described above. Upon pressurizing the fluid chamber 20, the piston 14 is urged slightly to the left as shown in FIG. 1, thereby unloading the nut 60 from the backing plate whereupon the motor 66 is operated in a reverse manner thereby rotating the nut 60 to the left, as seen in FIG. 1. It is only necessary to rotate or move the nut away from the backing plate a small amount so that it does not interfere with piston travel during normal brake operation. Alternatively, the nut may be moved into contact with the other stop 64 to insure the existence of a sufficient clearance between the nut 60 and backing plate 52.

As mentioned above, the extending end 44 of the piston rod 30 is formed to receive a tool such as a socket, wrench or screwdriver. The purpose of this is to provide a failure mode in the event that the motor 66 is inoperative. If the motor 66 fails, it will be impossible to automatically move the nut 60 away from the backing plate 52 to disengage the parking brake function. If this situation occurs, the piston rod 30 may be rotated manually by an operator or mechanic. As can be seen in this situation, the piston rod operates as a lead screw and as it is rotated the nut 60 will be moved from its contacting position with the backing plate thereby disengaging the parking brake function and permitting the piston to move during normal brake operation.

Many changes and modifications in the above described embodiment of the invention can, of course, be carried out without departing from the scope thereof. Accordingly, that scope is intended to be limited only by the scope of the appended claims.

I claim:

1. A parking brake (10) having engaged and disengaged modes of operation comprising:

a caliper (12), a piston (14) movably mounted in the caliper (12), and a brake pad (16) movable with the piston, the caliper (12) and piston (14) defining a fluid chamber (20) adapted to receive pressurized fluid;

a piston rod (30) movable with the piston (12) having a threaded portion (40), a nut (60) rotatably movable on the threaded portion (40) relative to a first stop (52);

first means (80, 82, 84, 92); for pressurizing the fluid chamber (20) to move the piston (14) and piston rod (30) attached thereto in a first direction to a brake engaged position; and second means (66, 68) for rotating the nut (60) in one of a) synchronism with pressurizing the fluid chamber and b) subsequent to pressurizing the fluid chamber so that the nut moved along the threaded portion (40), of the piston rod, into contact with the first stop (52) thereby preventing the piston rod (30) from moving in a direction opposite the first direction away from its engaged position, wherein the second means (66, 68) comprises:

a first motor (66);

a first gear (68) rotated by the first motor (66); and wherein the nut (60) includes gear teeth (62) about its periphery drivingly connected to and slidably interacting along the teeth of the first gear (68).

2. The device (10) as defined in claim 1 wherein the first gear comprises a cylindrical spur gear.

3. The device (10) as defined in claim 1 including third means for sensing that the piston rod (30) has been locked in the engaged position.

4. The device as defined in claim 3 wherein the third means includes means for sensing an increase in current level in the first motor (66) subsequent to the nut (60) being driven against the first stop (52).

5. The device (10) as defined in claim 4 wherein the first means is operative to pressurize the fluid chamber (20) in a manner sufficient to unstress the nut (6) from load imparted thereto by the first stop (52) when in the contacting position, and the second means operative to rotate the nut (60) away from the first stop (52) so that the piston rod (30) is free to move with the piston (10).

6. The device (10) as defined in claim 1 wherein the brake (10) includes a rotor (18) contacted by the brake pad (16) when the piston rod (30) is in the engaged positions.

7. The device (10) as defined in claim 6 wherein the first means (80, 82, 84; 92) includes one of: a) a master cylinder and b) a pump (82) powered by a second motor (84) in communication with the fluid chamber (20).

8. The device as defined in claim 7 including means for activating the second motor to pressurize the fluid chamber.

9. The device as defined in claim 1 wherein an end of the piston rod (30), remote from the piston (14) is shaped to receive a tool such that the piston rod can be rotated manually from its engaged position in the event the first motor becomes inoperative.

* * * * *